(12) United States Patent  (10) Patent No.: US 7,189,181 B2
Gumpoltsberger                 (45) Date of Patent: Mar. 13, 2007

(54) MULTI-STEP TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 174 days.

(21) Appl. No.: 10/520,749

(22) PCT Filed: Jul. 7, 2003

(86) PCT No.: PCT/EP03/07243
§ 371 (c)(1),
(2), (4) Date: Jan. 10, 2005

(87) PCT Pub. No.: WO2004/007999
PCT Pub. Date: Jan. 22, 2004

(65) Prior Publication Data
US 2005/0261102 A1    Nov. 24, 2005

(30) Foreign Application Priority Data
Jul. 11, 2002 (DE) ................. 102 31 346

(51) Int. Cl.
F16H 3/66 (2006.01)
(52) U.S. Cl. ............ 475/290; 475/278; 475/280
(58) Field of Classification Search ......... 475/323, 475/275, 326, 284, 286, 296, 277, 279, 278, 475/280, 290
See application file for complete search history.

(56) References Cited

U.S. PATENT DOCUMENTS 4,395,925 A    8/1983  Gaus
5,049,116 A *  9/1991  Asada ............... 475/269
5,106,352 A    4/1992  Lepelletier
5,295,924 A    3/1994  Beim
5,342,257 A    8/1994  Hotta et al.

(Continued)

FOREIGN PATENT DOCUMENTS

DE    689 07 338 T2    11/1993

(Continued)

OTHER PUBLICATIONS

Tenberge, Prof. Dr. P., "E-Automatikgetriebe mit Esprit", VDI-BERICHTE, Nr. 1610, VDI Verlag GmbH-Düsseldorf, Germany, Jun. 20, 2001, pp. 455-479.

Primary Examiner—Sherry Estremsky
Assistant Examiner—Edwin A. Young
(74) Attorney, Agent, or Firm—Davis, Bujold & Daniels P.L.L.C.

(57) ABSTRACT

A multi-step transmission comprises an input and output shaft arranged in a housing, three spider supported planetary gear sets, seven rotatable shafts; six switch elements; input occurs via a shaft, in connection with the planet carrier of the first planetary gear set, output occurs via a shaft, in connection with the planet carrier of the second planetary gear set and the planet carrier of the third planetary gear set; a shaft is in connection with the sun gear of the first planetary gear set; a shaft is in connection with the ring gear of the second planetary gear set and the ring gear of the third planetary gear set; a shaft is in connection with the sun gear of the third planetary gear set; a shaft is in connection with the ring gear of the first planetary gear set; a shaft is connected to the sun gear of the second planetary gear set.

22 Claims, 3 Drawing Sheets

U.S. PATENT DOCUMENTS

| | | | |
|---|---|---|---|
| 5,435,792 A | 7/1995 | Justice et al. | |
| 5,455,767 A | 10/1995 | Staerker | |
| 5,514,050 A | 5/1996 | Bäuerle et al. | |
| 5,913,746 A | 6/1999 | Bäuerle | |
| 6,053,839 A | 4/2000 | Baldwin et al. | |
| 6,083,135 A | 7/2000 | Baldwin et al. | |
| 6,139,463 A | 10/2000 | Kasuya et al. | |
| 6,217,474 B1 | 4/2001 | Ross et al. | |
| 6,425,841 B1 | 7/2002 | Haka | |
| 6,558,287 B2 | 5/2003 | Hayabuchi et al. | |
| 6,572,507 B1 | 6/2003 | Korkmaz et al. | |
| 6,634,980 B1 | 10/2003 | Ziemer | |
| 6,669,597 B1 * | 12/2003 | Usoro et al. | 475/323 |
| 6,723,018 B2 | 4/2004 | Hayabuchi et al. | |
| 7,018,319 B2 * | 3/2006 | Ziemer | 475/296 |
| 2003/0054917 A1 | 3/2003 | Raghavan et al. | |
| 2003/0083174 A1 * | 5/2003 | Tabata et al. | 475/323 |
| 2003/0203784 A1 | 10/2003 | Usoro et al. | |
| 2004/0097324 A1 | 5/2004 | Ziemer | |
| 2004/0116238 A1 | 6/2004 | Ziemer | |

FOREIGN PATENT DOCUMENTS

| | | |
|---|---|---|
| DE | 691 16 480 T2 | 6/1996 |
| DE | 199 12 480 A1 | 9/2000 |
| DE | 199 49 507 A1 | 4/2001 |
| DE | 100 43 751 A1 | 6/2001 |
| DE | 102 00 379 A1 | 8/2002 |
| DE | 102 13 820 A1 | 10/2002 |
| DE | 102 50 374 A1 | 6/2003 |
| DE | 102 31 350 A1 | 1/2004 |
| EP | 0 434 525 A1 | 6/1991 |
| EP | 0 378 900 B1 | 6/1993 |
| EP | 1 411 269 A2 | 4/2004 |
| GB | 1 522 616 | 8/1978 |
| JP | 02026352 A * | 1/1990 |
| JP | 04119245 A | 4/1992 |
| JP | 2000234664 | 8/2000 |
| JP | 2000291747 A | 10/2000 |
| JP | 2001082555 A | 3/2001 |
| JP | 2002323098 A | 11/2002 |
| WO | WO-02/079670 A2 | 10/2002 |
| WO | WO-02/079671 A2 | 10/2002 |
| WO | WO 03/095865 A1 | 11/2003 |

* cited by examiner

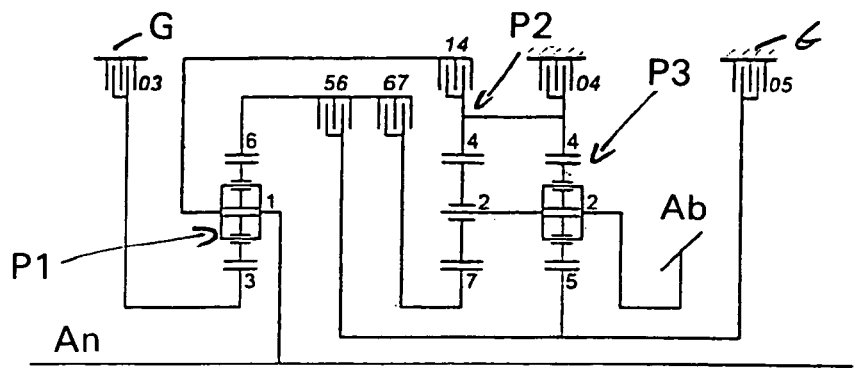
Fig. 1
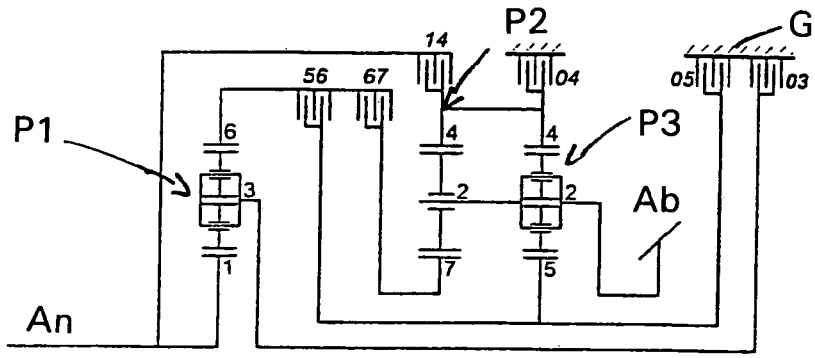
Fig. 2
| Gear: | 03 | 04 | 05 | 14 | 56 | 67 | i | φ |
|---|---|---|---|---|---|---|---|---|
| 1 | ● | ● |   |   |   | ● | 5.09 | 1.74 |
| 2 | ● |   | ● |   |   | ● | 2.92 | 1.64 |
| 3 | ● |   |   |   | ● | ● | 1.78 | 1.51 |
| 4 | ● |   |   | ● |   | ● | 1.18 | 1.18 |
| 5 |   |   |   | ● | ● | ● | 1.00 | 1.23 |
| 6 | ● |   |   | ● | ● |   | 0.81 | 1.24 |
| 7 | ● |   | ● | ● |   |   | 0.66 | 0.67 |
| R | ● | ● |   |   | ● |   | -3.40 | 7.75 |
Fig. 3

MULTI-STEP TRANSMISSION

This application is a national stage completion of PCT/EP2003/007243 filed Jul. 7, 2003 which claims priority from German Application Serial No. 102 31 346.6 filed Jul. 11, 2002.

FIELD OF THE INVENTION

The present invention relates to a multi-step transmission in planetary style, in particular an automatic transmission for a motor vehicle.

BACKGROUND OF THE INVENTION

In accordance with the state of the art, automatic transmissions intended especially for motor vehicles comprise planetary gear sets that are shifted by means of friction or switch elements, such as couplings and brakes, and are usually connected to a starter element, which is subjected to a slip effect and selectively to a starter element equipped with a bypass clutch, such as a hydrodynamic torque converter or a hydraulic coupling.

A transmission such as this can be seen in EP 0 434 525 A1. It comprises essentially an input shaft and an output shaft, which are arranged parallel to each other, a double planetary gear set arranged concentric with respect to the output shaft and five switch elements in the form of three clutches and two brakes, whose selective locking, respectively in pairs, determines the different gear ratios between the input shaft and the output shaft. For this purpose, the transmission has a front-mounted gear set and two power paths so that six forward gears are obtained by way of the selective meshing in pairs of the five switch elements.

In the first power path, two clutches for transmitting the torque from the front-mounted gear set to two elements of the double planetary gear set are required. These are arranged in the direction of the power flow essentially behind the front-mounted gear set in the direction of the double planetary gear set. In the second power path, another clutch is provided, which detachably connects the same to a further element of the double planetary gear set. The clutches are arranged herein such that the inner disk support forms the output.

A compact multi-step transmission in planetary style, intended especially for a motor vehicle, is also known from U.S. Pat. No. 6,139,463, which has two planetary gear sets and one front-mounted gear set as well as three clutches and two brakes. Two clutches C-1 and C-3 are provided in a first power path in order to transmit the torque from the front-mounted gear set to the two planetary gear sets in this known multi-step transmission. The outer disk support or the cylinder or piston and pressure equalization side of the clutch C-3 is herein connected to a first brake B-1. In addition, the inner disk support of the third clutch C-3 is connected to the cylinder or piston and pressure equalization side of the first clutch C-1, wherein the inner disk support of the first clutch C-1 is arranged on the side of the output and is connected to a sun gear of the third planetary gear set.

In addition, a multi-step transmission is known from DE 199 49 507 A1 of the Applicant, in which two forward-mounted gear sets, which are not shiftable, are provided on the input shaft and these gear sets generate two speeds on the side of the output which, aside from the speed of the input shaft, can be optionally shifted on a shiftable double planetary gear set that acts on the output shaft in such a way by means of optionally locking the employed switch elements that in order to shift from one gear into the respective next higher or lower gear only one of the two switch elements that were just actuated must be activated or deactivated.

An automatically shiftable motor vehicle transmission having three spider supported planetary sets as well as three brakes and two clutches in order to shift six forward gears and one reverse gear and having an input shaft as well as an output shaft is known furthermore from DE 199 12 480 A1. The automatically shiftable motor vehicle transmission is configured in such a way that the input shaft is connected directly to the sun gear of the second planetary gear train, and that the input shaft can be connected via the first clutch to the sun gear of the first planetary gear set and/or via the second clutch to the planet carrier of the first planetary gear set. In addition or as an alternative thereto, the sun gear of the first planetary gear train can be connected via the first brake to the housing of the transmission and/or the planet carrier of the first planetary gear set can be connected via the second brake to the housing and/or the sun gear of the third planetary gear set can be connected via the third brake to the housing.

It is the object of the present invention to propose a multi-step transmission of the kind mentioned above, in which the constructive effort is optimized and, in addition, the effectiveness in the main driving gears is improved with respect to drag loss and gearing loss. In addition, low torque should act on the switch elements and planetary gear sets and also the speeds of the shafts, switch elements and planetary gear sets should be kept as low as possible in the multi-step transmission of the invention. In addition, the number of gears as well as the transmission spread should be increased.

SUMMARY OF THE INVENTION

A multi-step transmission in planetary style having an input shaft and an output shaft, which are arranged in a housing, is proposed in accordance with the invention. In addition, at least three spider supported planetary gear sets, at least seven rotatable shafts, as well as six switch elements comprising brakes and clutches are provided, whose selective meshing effects different gear ratios between the input shaft and the output shaft so that preferably seven forward gears and one reverse gear can be realized.

According to the invention, it is provided in the multi-step transmission that the input occurs by means of a shaft, which is in permanent connection with an element of the first planetary gear set and the output occurs via a shaft, which is connected to the planet carrier of the second planetary gear set and to the planet carrier of the third planetary gear set. Furthermore, it is provided in the multi-step transmission, according to the invention, that a further shaft is in permanent connection with another element of the first planetary gear set; another shaft is in permanent connection with the ring gear of the second planetary gear set and the ring gear of the third planetary gear set; another shaft is in permanent connection with the sun gear of the third planetary gear set, another shaft is in permanent connection with the ring gear of the first planetary gear set, and another shaft is in permanent connection with the sun gear of the second planetary gear set, while the planetary gear sets are coupled to shafts and switch elements. The input shaft can herewith be connected to the sun gear or to the planet carrier of the first planetary gear set, while the one other shaft that is connected to the first planetary gear set is accordingly connected to its planet carrier or sun gear.

The first and third planetary gear sets are configured as plus planetary gear sets; the second planetary gear set is a minus planetary gear set.

The embodiment of the multi-step transmission results in suitable gear ratios as well as a considerable increase of the total spread of the multi-step transmission, leading to an improvement in the driving comfort and a significant reduction in fuel consumption.

The multi-step transmission is suitable for any motor vehicle, in particular for automobiles and utility vehicles, such as trucks, buses, construction equipment, rail vehicles, crawler chain vehicles and the like.

The construction effort is considerably reduced with the multi-step transmission of the invention by means of a low number of switch elements, preferably four clutches and two brakes. The multi-step transmission of the invention beneficially offers the possibility of carrying out a startup with a hydrodynamic converter, an external starting clutch or also with other suitable external startup elements. It is also conceivable to enable a starting operation with a starting element integrated into the transmission. A switch element that is actuated in the first gear and in the reverse gear is preferred.

Good efficiency in the main driving gears in terms of drag and gearing losses can further result from the multi-step transmission according to the invention.

Additionally, low torque exists in the switch elements and in the planetary gear sets of the multi-step transmission, whereby wear can be considerably reduced in an advantageous way in the multi-step transmission. The low torque enables also accordingly small dimensions, whereby the required installation space and the corresponding costs are reduced. Moreover also low speeds exist on the shafts, the switch elements and the planetary gear sets.

The transmission of the invention is also designed such that adaptability to different drive train embodiments is made possible in the direction of power flow as well as also from a space point of view.

BRIEF DESCRIPTION OF THE DRAWINGS

The invention will now be described, by way of example, with reference to the accompanying drawings in which:

FIG. 1 shows a schematic view of a preferred embodiment of a multi-step transmission according to the invention;

FIG. 2 shows a schematic view of a further preferred embodiment of a multi-step transmission according to the invention;

FIG. 3 shows a circuit diagram of the multi-step transmission according to the invention shown in FIGS. 1 and 2;

DETAILED DESCRIPTION OF THE INVENTION

Figure 4:
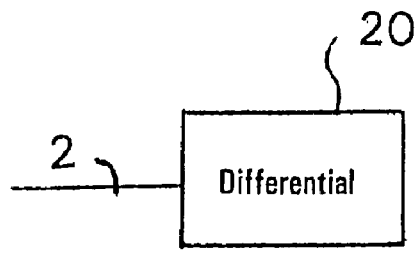
FIG. 4 is a diagrammatic view of an embodiment of the multi-step transmission having a differential.

The multi-step transmission is depicted in FIGS. 1 and 2 with an input shaft 1 (An) and an output shaft 2 (Ab), which are arranged in a housing G. Three spider supported planetary gear sets P1, P2, P3 are provided. The first planetary gear set P1 and the third planetary gear set P3 are configured herein as plus planetary gear sets; the second planetary gear set P1 is configured as a minus planetary gear set in accordance with the invention.

It is also possible to combine the second planetary gear set P2 and the third planetary gear set P3 as a Ravigneaux planetary gear set with common planet carrier and common ring gear.

As can be seen from FIGS. 1 and 2, merely six switch elements, namely, three brakes 03, 04, 05 as well as three clutches 14, 56 and 67 are provided.

Selective shifting of seven forward gears and one reverse gear can be realized with the switching elements. The multi-step transmission has a total of seven rotatable shafts according to FIG. 1, namely, the shafts 1, 2, 3, 4, 5, 6 and 7.

According to the invention, it is provided in the multi-step transmission of FIG. 1 that the input occurs by means of the shaft 1, which is in permanent connection with the planet carrier of the first planetary gear set P1. The output occurs via the shaft 2, which is connected to the planet carrier of the second planetary gear set P2 and the planet carrier of the third planetary gear set P3. The shaft 3 is in permanent connection with the sun gear of the first planetary gear set P1 and the shaft 4 is in permanent connection with the ring gear of the second planetary gear set P2 and the ring gear of the third planetary gear set P3. The shaft 5 is furthermore in permanent connection with the sun gear of the third planetary gear set P3. The further rotatable shaft 6 is in permanent connection with the ring gear of the first planetary gear set P1, wherein the shaft 7 is in permanent connection with the sun gear of the second planetary gear set P2.

In the multi-step transmission according to the invention, the shaft 3 can be coupled by means of the brake 03; the shaft 4 can be coupled by means of the brake 04 and the shaft 5 can be coupled by means of the brake 05 to the housing G. The clutch 14 connects the shaft 1 and the shaft 4 detachably to each other; the shaft 5 and the shaft 6 can be detachably connected by means of the clutch 56. The clutch 67 also detachably connects the shafts 6 and 7.

FIG. 2 shows a further embodiment of the multi-step transmission according to the invention. The only difference compared to the embodiment of FIG. 1 consists in that the drive shaft 1 is connected to the sun gear of the first planetary gear set P1 and that the shaft 3 is in permanent connection with the planet carrier of the first planetary gear set P1.

FIG. 3 depicts a circuit diagram of the multi-step transmission according to the invention, in accordance with FIGS. 1 and 2. A respective gear ratios i of the individual gear levels and a level jumps Φ to be determined therefrom can be seen, for example, from the circuit diagram. It can also be seen from the circuit diagram that double shifting can be prevented in the case of sequential shifting, since two neighboring gear levels jointly utilize two switch elements, respectively.

The brake 03 is permanently activated for the first four gears; in addition, the brake 04 and the clutch 67 are engaged for the first gear; the brake 05 and the clutch 67 are engaged for the second gear; the clutches 56 and 67 are engaged for the third gear and the clutches 14 and 67 are engaged for the fourth gear. The clutches 14, 56 and 67 are engaged for the fifth gear. The sixth gear results from engaging the brake 03 as well as the clutches 14 and 56 in accordance with FIG. 3; the seventh gear requires the clutch 14 as well as the brakes 03 and 05. For the reverse gear the brakes 03 and 04 as well as the clutch 56 are engaged.

Figure 10:
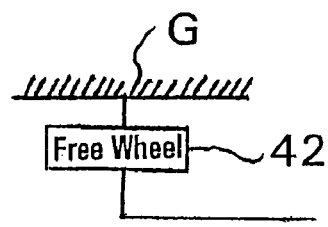
FIG. 10 is a diagrammatic view of the multi-step transmission having a free wheel.

It is possible, according to the invention, as shown in FIG. 10, to provide an additional free wheel (s) 42 at each suitable location of the multi-step transmission, for example, between a shaft and the housing G or possibly to connect two shafts.

Figure 13:
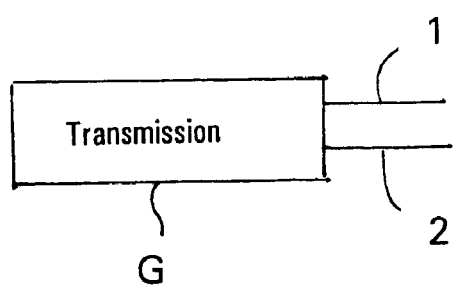
FIG. 13 is a diagrammatic view showing the input and the output on the same side of the transmission housing.

It is also possible by means of the design. as shown in FIG. 13, to arrange the input shaft and the output shaft, preferably for transverse wheel drive, front wheel drive, longitudinal wheel drive, rear longitudinal wheel drive or all wheel drive arrangements on the same side of the transmission or the housing G. On the side of the input shaft or on the side of the output shaft, in addition, an axle differential and/or an inter-axle differential 20 can be arranged, as shown in FIG. 4.

Figure 5:
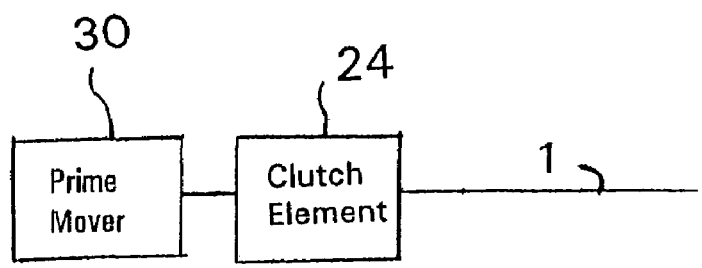
FIG. 5 is a diagrammatic view of the multi-step transmission with a clutch element and a prime mover.
Figure 6:
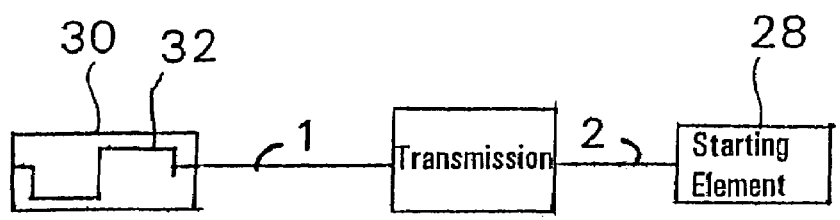
FIG. 6 is a diagrammatic view of the multi-step transmission located between a starting element and a prime mover.
Figure 7:
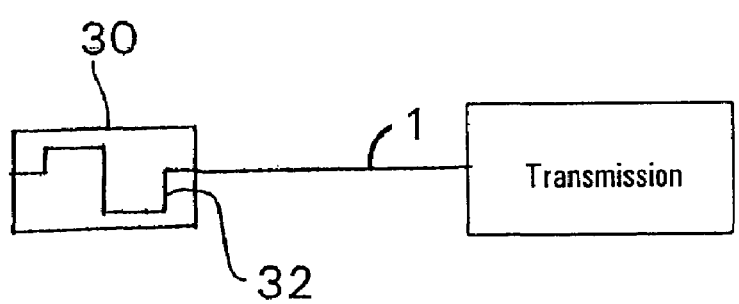
FIG. 7 is a diagrammatic view of the multi-step transmission for a front-transverse installation with a prime mover.

Within the scope of an advantageous further development, as shown in FIG. 5, the input shaft 1 can be separated according to need by means of a coupling or clutch element 24 from a driving motor or prime mover 30, wherein a hydraulic clutch, a hydrodynamic converter, a hydraulic coupling, a dry starting clutch, a wet starting clutch, a magnetic powder clutch or a centrifugal clutch can be used as the coupling element. It is also possible to arrange such a starting element behind the transmission in the direction of power flow so that, in this case, the input shaft 1 is in permanent connection with the crankshaft 32 of the engine or prime mover 30, as shown in FIGS. 6 and 7. Starting can occur also by means of a switch or shift element of the transmission. The brake 04, which is activated in the first forward gear as well as also in the first reverse gear, is preferably used as the starting element.

Figure 8:
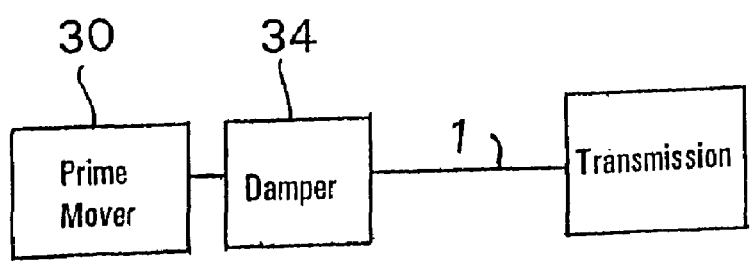
FIG. 8 is a diagrammatic view of the multi-step transmission with a prime mover and a damper.

The multi-step transmission, according to the invention, as shown in FIG. 8. also enables the arrangement of a torsional vibration damper 34 between the engine or prime mover 30 and the transmission.

Figure 9:
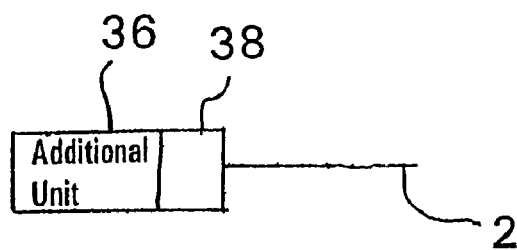
FIG. 9 is a diagrammatic view of the multi-step transmission with an auxiliary output for an additional unit.
Figure 12:
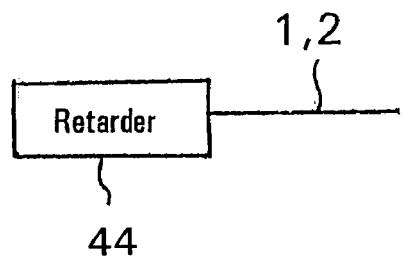
FIG. 12 is a diagrammatic view of one of the shafts having a retarder.

Within the scope of another embodiment, as shown in FIG. 12, a wear-free brake, such as a hydraulic or electric retarder 44 or the like, can be arranged on each shaft, preferably on the input shaft 1 or on the output shaft 2, which is of particular importance for use in utility vehicles. An auxiliary drive 38 can be provided in addition, preferably on the input shaft 1 or the output shaft 2, in order to drive the additional units 36 on each shaft, as shown in FIG. 9.

Figure 11:
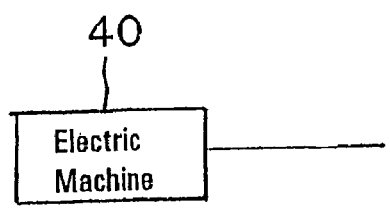
FIG. 11 is a diagrammatic view of the multi-step transmission with an electric machine.

A further advantage of the multi-step transmission presented herein consists in that an electric machine 40 can be accommodated on each shaft as a generator and/or as an additional driving machine, as shown in FIG. 11.

The functional features of the claims can be configured in the most different way in their design. For reasons of simplicity, these possible design embodiments are not explicitly described. However, each design configuration of the invention is covered by the protected scope of the claims, in particular any spatial arrangement of the planetary gear sets and the switch elements as well as with respect to each other and insofar as they are technically practical.

REFERENCE NUMERALS 1 shaft
2 shaft
3 shaft
4 shaft
5 shaft
6 shaft
7 shaft
03 brake
04 brake
05 brake
14 clutch
56 clutch
67 clutch
P1 planetary gear set
P2 planetary gear set
P3 planetary gear set
An input
Ab output
i gearing
Φ level jump
G housing

The invention claimed is:

1. A multi-step transmission of a planetary construction for a motor vehicle, comprising:
an input shaft (1) and an output shaft (2) which are arranged in a housing (G),
first, second and third planetary gear sets (P1, P2, P3),
at least third, fourth, fifth, sixth and seventh shafts (3, 4, 5, 6, 7), as well as at least six shifting elements (03, 04, 05, 14, 56, 67), brakes and clutches, whose selective engagement achieves different gear ratios between the input shaft (1) and the output shaft (2) so that seven forward gears and one reverse gear can be realized, drive input occurs by the input shaft (1) which is permanently connected with a first element of the first planetary gear set (P1); drive output occurs via the output shaft (2) which is permanently connected with a planet carrier of the second planetary gear set (P2) and a planet carrier of the third planetary gear set (P3); the third shaft (3) is permanently connected with a further element of the first planetary gear set (P1); the fourth shaft (4) is permanently connected with a ring gear of the second planetary gear set (P2) and a ring gear of the third planetary gear set (P3); the fifth shaft (5) is permanently connected with a sun gear of the third planetary gear set (P3); the sixth shaft (6) is permanently connected with a ring gear of the first planetary gear set (P1); the seventh shaft (7) is connected to a sun gear of the second planetary gear set (P2); the third shaft (3) can be coupled to the housing (G) by a first brake (03); the fourth shaft (4) can be coupled to the housing (G) by a second brake (04); the fifth shaft (5) can be coupled to the housing (G) by a third brake (05); a first clutch (14) detachably connects the input shaft (1) and the fourth shaft (4) with one another; a second clutch (56) detachably connects the fifth shaft (5) and the sixth shaft (6) with one another; and a third clutch (67) detachably connects the sixth shaft (6) and the seventh shaft (7) with one another.

2. The multi-step transmission of claim 1, wherein the input shaft (1) is permanently connected with the planet carrier of the first planetary gear set (P1) and the third shaft (3) is permanently connected with a sun gear of the first planetary gear set (P1).

3. The multi-step transmission of claim 1, wherein the input shaft (1) is permanently connected with a sun gear of the first planetary gear set (P1) and the third shaft (3) is permanently connected with a planet carrier of the first planetary gear set (P1).

4. The multi-step transmission of claim 1, wherein the first planetary gear set (P1) and the third planetary gear set (P3) are positive planetary gear sets, and the second planetary gear set (P2) is a negative planetary gear set.

5. The multi-step transmission of claim 4, wherein the second planetary gear set (P2) and the third planetary gear set (P3) are combined as a Ravigneaux planetary gear set with a common planet carrier and a common ring gear.

6. The multi-step transmission of claim 1, wherein a free wheel is located within the multi-step transmission.

7. The multi-step transmission of claim 6, wherein the multi-step transmission has a free wheel provided between at least one of the input shaft, the output shaft, the third, the fourth, the fifth, the sixth and the seventh shaft (1, 2, 3, 4, 5, 6, 7) and the housing (G).

8. The multi-step transmission of claim 1, wherein the input shaft (1) and the output shaft (2) are provided on a same side of the housing.

9. The multi-step transmission of claim 1, wherein at least one of an axle differential and inter-axle differential is arranged on one of an input side or an output side of the multi-step transmission.

10. The multi-step transmission of claim 1, wherein the input shaft (1) is separated from a prime mover by a clutch element.

11. The multi-step transmission of claim 10, wherein the clutch element is one of a hydrodynamic converter, a hydraulic clutch, a dry starting clutch, a wet starting clutch, a magnetic power clutch and a centrifugal clutch.

12. The multi-step transmission of claim 1, wherein an external starting element is located in a power flow direction downstream of the multi-step transmission, while the input shaft (1) is fixedly connected to a crankshaft of a prime mover.

13. The multi-step transmission of claim 1, wherein starting occurs by engagement of one of the at least six shifting elements (03, 04, 05, 14, 56, 67) of the multi-step transmission while the input shaft (1) is permanently connected with a crankshaft of a prime mover.

14. The multi-step transmission of claim 13, wherein one of the first brake (03) and the second brake (04) is used as the shifting element for starting the multi-step transmission.

15. The multi-step transmission of claim 1, wherein a torsional vibration damper is located between a prime mover and the multi-step transmission.

16. The multi-step transmission of claim 1, wherein one of the input shaft (1) and the output shaft (2) has a retarder.

17. The multi-step transmission of claim 1, wherein an auxiliary drive is located on at least one of the input shaft, the output shaft, the third shaft, the fourth shaft, the fifth shaft, the sixth shaft and the seventh shaft (1, 2, 3, 4, 5, 6, 7) in order to drive an additional unit.

18. The multi-step transmission of claim 17, wherein the auxiliary drive is located on one of the input shaft (1) and on the output shaft (2).

19. The multi-step transmission of claim 1, wherein the shifting elements are one of power-shift clutches or brakes.

20. The multi-step transmission of claim 19, wherein the shifting elements (03, 04, 05, 14, 56, 67) are one of multi-plate clutches, band brakes, and cone clutches.

21. The multi-step transmission of claim 1, wherein the shifting elements (03, 04, 05, 14, 56, 67) are one of positive locking brakes and clutches.

22. The multi-step transmission of claim 1, wherein an electric machine is accommodated on at least one of the input shaft, the output shaft, the third shaft, the fourth shaft, the fifth shaft, the six shaft and the seventh shaft (1, 2, 3, 4, 5, 6, 7) as one of a generator and as an auxiliary driving machine.

* * * * *